United States Patent [19]

Chamberlain

[11] Patent Number: 4,830,056

[45] Date of Patent: May 16, 1989

[54] COMPRESSED AIR DELIVERY SYSTEM

[76] Inventor: Donald N. Chamberlain, 553 Rivercrest Dr., Woodstock, Ga. 30188

[21] Appl. No.: 174,844

[22] Filed: Mar. 29, 1988

[51] Int. Cl.[4] .......... B60P 3/22

[52] U.S. Cl. .......... 137/899.4; 137/545; 137/550; 137/587; 137/592

[58] Field of Search .......... 137/899.4, 587, 544, 137/545, 550, 590, 592, 549

[56] References Cited

U.S. PATENT DOCUMENTS

| | | | |
|---|---|---|---|
| 2,037,830 | 4/1936 | Staley | 137/899.4 |
| 2,804,259 | 8/1957 | Ralston | 137/899.4 |
| 2,826,354 | 3/1958 | Field | 137/899.4 |
| 3,023,776 | 3/1962 | Franz | 137/587 |
| 3,115,894 | 12/1963 | Marx | 137/587 X |
| 4,129,146 | 12/1978 | Schuler | 137/587 |

OTHER PUBLICATIONS

Finite Filter Co., Inc. "Fine Aire All-Glass/Epoxy Coalescing Filter", Technical Bulletin—485, Apr. 1985.

*Primary Examiner*—John Rivell
*Attorney, Agent, or Firm*—Jones, Askew & Lunsford

[57] ABSTRACT

There is disclosed a compressed air delivery system for delivering clean, dry, compressed air from a source of compressed air to a compressed air appliance. The compressed air delivery system includes a vertical, cylindrical tank with an inlet located in the lower ⅓ of the tank and an outlet located near the top of the tank so that the air in the tank becomes stratified with the light, clean air at the top. The inlet to the tank includes in series a connector connected to a source of compressed air, a stepdown regulator, a check valve, an inlet port, and an inlet tube filled with packing material. The outlet of the tank includes in series a drop tube inside the tank, an outlet port, a shut off valve, a particulate filter, a coalescing filter, a stepdown regulator, and an output coupler.

14 Claims, 2 Drawing Sheets

COMPRESSED AIR DELIVERY SYSTEM

BACKGROUND OF THE INVENTION

This invention relates generally to compressed air delivery systems, and more particularly concerns a compressed air delivery system for delivering clean, dry, compressed air from a source of compressed air to a compressed air appliance.

With the introduction of base coat and clear coat finishes on new automobiles, it has become necessary that paint and body shops be able to duplicate those finishes when repainting damaged automobiles. In order to provide a smooth, blemish free paint job, it is necessary that the compressed air supplied to the pneumatic paint gun be free of particulate, water vapor, and oil vapor and that the pressure at the paint gun remain essentially free of fluctuations.

Various attempts have been undertaken to assure the cleanliness of the air provided to paint guns including refrigerated air dryers and filters of all types ranging from a coalescing filters, desiccant filters, and even toilet paper filters have been used unsuccessfully to control the cleanliness of the air. By installing a number of particulate filters and coalescing filters in series between the compressed air source, it is possible to provide air that is of sufficient cleanliness but under most circumstances the useful life of such filters is relatively short, and they must be replaced as often as daily in some instances. Even with the use of filters, however, unacceptable painting performance may results from fluctuations in the air pressure as a result of several paint guns being operated simultaneously from a single source of compressed air.

SUMMARY OF THE INVENTION

It is therefore an object of the present invention to provide a compressed air delivery system which provides clean, dry, compressed air to a compressed air appliance at a constant air pressure.

It is likewise an object of the present invention to provide a compressed air delivery system which assures that the compressed air is essentially free of water vapor, oil vapor, and particulate.

The foregoing objectives are realized by a vertical compressed air tank installed between a source of compressed air and a compressed air appliance. The tank includes an inlet means located between the top and bottom of the tank which inlet means consists of an inlet port, a step down regulator, a check valve, and an inlet tube which extends into the tank. The step down regulator and check valve are connected in series between the source of compressed air and the inlet port of the tank. The inlet tube serves as an initial filter and coalescer and has a number of openings along its length with an inert packing material inside. The inert packing material provides a tortuous path and a large surface area for impaction by the compressed air passing from the inlet port into the interior of the tank so that particulate and aerosol particles are trapped.

The tank further has an outlet means at the top of the tank which outlet means consists of a drop tube, an outlet port, a particulate filter, and a coalescing filter. The particulate filter and coalescing filter are connected in series between the outlet port and the compressed air appliance. The drop tube extends into the tank from the outlet port and has a number of restricted holes along its length, a core, and a lower drain opening. The drop tube assures that air is drawn from a stratum of air at the top of the tank but not from directly adjacent the upper end wall of the tank so that a laminar flow of air is not created along the wall of the tank. In addition, the restricted holes in the drop tube provide increased velocity and therefore condensation of moisture in the air onto the core of the drop tube so that the condensed moisture can then drip to the bottom of the tank where it can ultimately be drained.

The tank with its elongated vertical construction assures that the effects of gravity stratify the air in the tank with the lightest air which is free of water vapor, oil vapor and particulate is at the top of the tank near the drop tube while the heaviest air laden with water vapor, oil vapor, and particulate sinks to the bottom of the tank.

Other objects and advantages of the invention will become apparent upon reading the following detailed description and upon reference to the drawings.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 1:
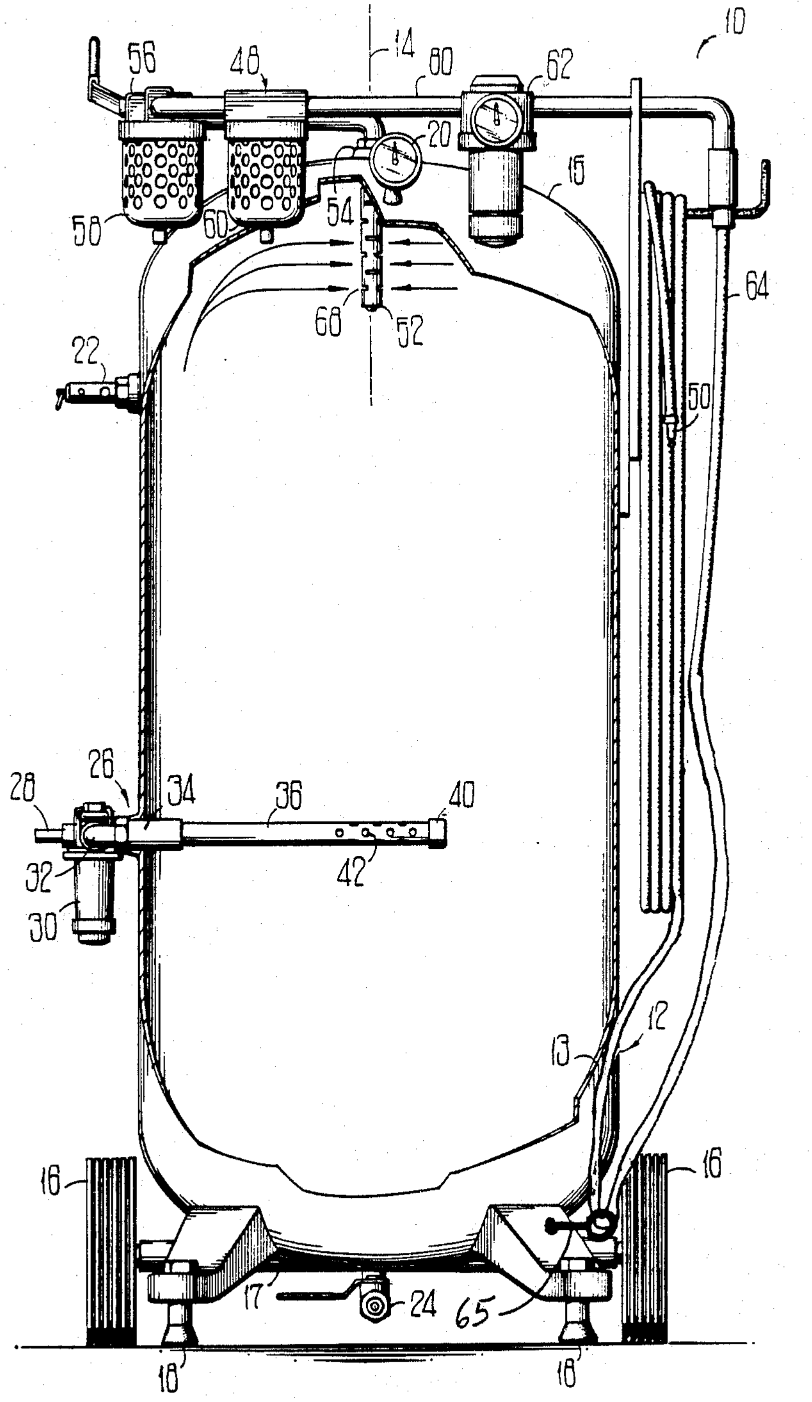
FIG. 1 is a front elevation view, partially sectioned, of the compressed air delivery system of the present invention.

Turning to FIG. 1, there is shown a compressed air delivery system 10 for delivering clean, dry, compressed air from a source of compressed air to a compressed air appliance at a constant pressure. The compressed air delivery system includes a tank 12 which has a cylindrical side wall 14, a top end cap 15, and a bottom end cap 17. The tank is generally cylindrical in cross-section about an axis 14. The tank is mounted on wheels 16 and legs 18 so that the tank 12 during use is oriented with its axis 14 vertical. The tank 12 is equipped with a pressure gauge 20 for indicating the air pressure inside the tank 12 and a relief valve 22 for releasing the pressure inside the tank when the pressure exceeds a predetermined safe level. In addition, the tank includes a drain valve 24 mounted in the bottom end cap 17 which drain valve 24 may be either manually or automatically operated to drain liquid and other contaminates that have collected in the bottom of the tank.

The tank 12 has an inlet port 34 located in the side wall 13 receiving compressed air from a source of compressed air (not shown) and an outlet port 54 located in the top end cap 15 for delivering compressed air to a compressed air appliance (not shown). Because of the vertical orientation of the tank, the compressed air in the tank becomes stratified. The light air having the lowest concentration of suspended particulate, water vapor, and oil vapor rises to the top while the heavier, dirty air sinks to the bottom. As a result, the tank's orientation serves to separate the clean and dirty air prior to delivery to the compressed air appliance.

Further cleaning of the compressed air and suppression of pressure fluctuations are achieved by inlet means 26 and outlet mens 48 of the tank. Inlet means 26 consists of, in series, an inlet connector 28, an adjustable pressure regulator 30, a check valve 32, inlet port 34, and an inlet tube 36. The inlet connector 28 is connected to a source of compressed air (not shown). The pressure regulator 30 in the preferred embodiment is adjustable so that the air pressure at the inlet connector 28 can be a stepdown to a lower pressure before the compressed air is admitted to the inside of the tank 12. The check valve 32 assures that compressed air flows only in the direction into the tank and thereby isolates air pressure in the tank from air pressure fluctuations at the inlet connector 28. The inlet port is located in the side wall 13 between the end caps 15 and 17 and preferably is located within the bottom ⅓ of the tank. The inlet means components and all connecting fittings are brass to reduce scaling and rust.

Figure 3:
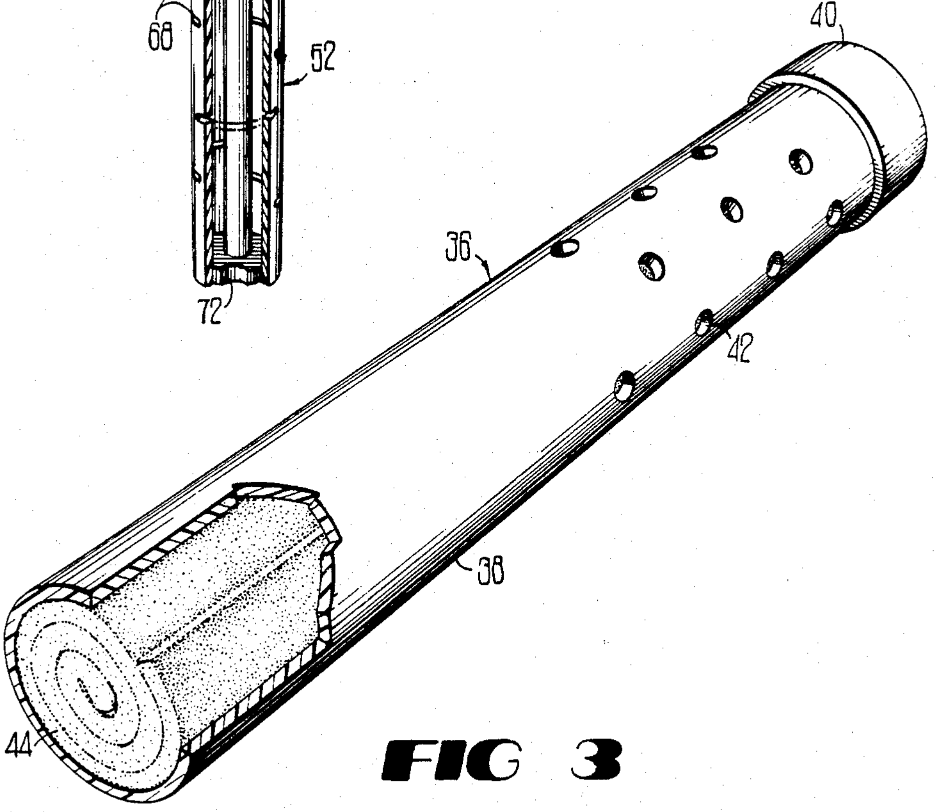
FIG. 3 is a perspective view, partially sectioned, of the inlet tube of the present invention.

The inlet tube 36 is shown in greater detail in FIG. 3 and includes a cylindrical pipe 38 which may be of any suitable material such as PVC, brass, or the like. The pipe 38 has an end cap 40 and a number of holes 42 located adjacent the end cap 40. The inside of the pipe 38 is packed with a suitable packing material 44. In a preferred embodiment the packing material is simply rolled foam rubber. The packing material however, may be any material which is inert to oil and moisture and which provides a tortuous path with high surface contact area for the compressed air as it passes from the inlet port 34 to the holes 42 of the inlet tube 36. The packing material should not in general produce a pressure drop of greater than 5 psi across the inlet tube. The inlet tube 36 serves to trap gross particulate which may be found in the compressed air delivered to the inlet connector 28 as well as to provide a surface on which gross water vapor and oil vapor may condense and coalesce. In essence, the inlet tube 36 with its packing 44 serves as a first filter to remove gross quantities of particulate, water vapor, and oil vapor. In addition to the preferred foam rubber packing 44, other materials such as fiberglass, stranded stainless steel, and stranded aluminium may be used for the packing 44.

The outlet means 48 includes, in series, an outlet drop tube 52, outlet port 54, a shut off valve 56, a particulate filter 58, a coalescing filter 60, an outlet pressure regulator 62, a flexible hose 64, and outlet coupler 50. The outlet coupler 50 typically is a quick coupler which can be attached to a paint gun or other air appliances to be driven by the compressed air from the compressed air delivery system 10. The outlet means components and all interconnecting fittings are brass to reduce scaling and rust.

In order to assure the tank 12 is not overturned by an operator pulling on the coupler end of the hose 64, the hose 64 is looped through eyelet 65 adjacent the bottom of the tank. Consequently, any pulling force on the hose is transmitted to the tank at a point well below the tank's center of gravity.

Figure 2:
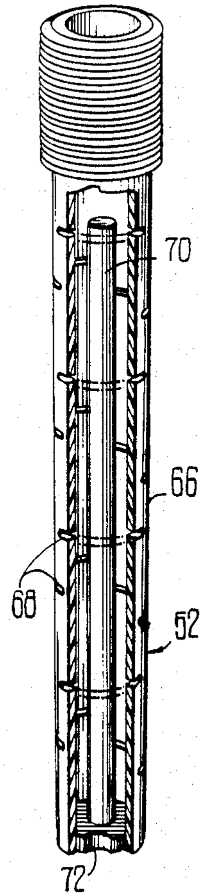
FIG. 2 is a perspective view, partially sectioned, of the drop tube used in connection with the present invention.

The drop tube 52 which is shown in greater detail in FIG. 2 consists of a hollow pipe 66 of any suitable material such as PVC with a number of restricted holes or slots 68 cut along the length of the tube 66. A steel rod 70 extends coaxially inside of the tube 66, and a restricted opening 72 is provided at the lower end of the drop tube 52. The drop tube serves two purposes. First, the drop tube assures that the compressed air in the tank is drawn from the entire strata of air defined by the length of the drop tube 52 which has holes 68. If the drop tube were not provided, the air drawn directly into the outlet port 54 would produce a laminar flow of air along the curved end cap 15 of the tank 12 which in turn would cause dirty, heavier air from adjacent the side wall 13 farther down in the tank to be drawn with the laminar flow into the outlet. Thus, the drop tube 52 is provided to eliminate laminar flow along the sides of the tank which would tend to draw dirty air from lower within the tank. Second, the drop tube with its internal rod 70 provides a condenser at the outlet port 54. Particularly, as air passes into the restricted openings 68, its velocity increases thereby causing a drop in pressure, a rise in the dew point, and the condensation of vapor onto the rod 70. The moisture that condenses on the rod 70 simply flows down the rod and drains out of the bottom hole 72 into the bottom of the tank 12 for ultimate discharge through the drain valve 24.

After passing through the outlet port 54, the compressed air passes through shutoff valve 56 and to the particulate filter or scrubber 58. The particulate filter 58 is a conventional particulate filter, such as a F100-4 filter made by Master Pneumatics of Detroit, Michigan. The particulate filter 58 is selected to trap all particulate matter that is greater in size than 40±2 microns. In that regard, the preferred particulate filter 58 has a porous polyethylene filter medium which in addition serves to trap some water vapor and oil vapor as well.

After the air has passed through the particulate filter 58, it passes through coalescing filter 60. The coalescing filter 60 is a conventional coalescing filter such as an FC100-4 coalescing filter manufactured and sold by Master Pneumatics of Detroit, Mich. The coalescing filter 60 is designed to have a D.O.P. efficiency for 0.3 to 0.6 micron particles of 99.97 percent. The maximum size aerosol particle passed by the filter is preferably 0.75 microns, and the maximum size solid particle passed is preferably 0.3 microns. After the air has passed through the coalescing filter 60, it is fed via pipe 80 to the adjustable pressure regulator 62 which allows the operator to adjust the pressure at the outlet coupler 50 to the desired pressure.

In operation, the compressed air delivery system of the present invention assures the delivery of clean, dry, compressed air at a constant pressure at the outlet coupler 50. Particularly, particulate, water vapor, and oil vapor, are removed by the combinations of the filters such as the inlet tube 36, the particulate filter 58, and the coalescing filter 60. In addition, because the tank is oriented with its axis 14 vertical, the air itself stratifies within the tank so that the heavy air, which is laden with particulate, water vapor, and oil vapor, sinks to the bottom of the tank and the light, dry air rises to the top of the tank.

Because of the stratification provided in the tank, the amount of particulate and vapor that the filters 58 and 60 must remove from the air before delivery to the outlet coupler 50 is remarkably reduced so that the life of those filters is remarkably increased. In a conventional paint shop environment, where the compressed air is fed directly through filters such as 58 and 60 before being delivered to a paint gun, the filters such as 58 and 60 may last for only one or two days before they have become saturated and require replacement. The compressed air delivery system 10 of the present invention including the tank and inlet pipe 36 along with the drop tube 52 allow filters 58 and 60 to operate for as long as six to ten months before they must be changed.

In addition to the ability of the compressed air delivery system 10 of the present invention to provide clean, dry, compressed air at outlet connector 50, the system 10 also is able to provide air a constant pressure. The tank 12 serves as a reservoir so that any fluctuations of the air pressure at inlet connector 28 are virtually eliminated by the combination of the check valve 32 and the reservoir capacity of the tank 12 itself.

In addition, the inlet regulator 30 steps the air pressure down, for example from 150 psi at the connector 28 to 100 psi inside the tank 12. The step down assures that sufficient capacity in the compressed air system ahead of connector 28 is available to provide a constant pressure of 100 psi within the tank 12. In addition, lowering the pressure from a system pressure of 150 psi to a tank pressure of 100 psi lowers the dew point of the incoming air thereby allowing it to give up its moisture as it passes into the tank and through the inlet pipe 36. The stepdown output regulator 56 steps the pressure down again to between 45 psi and 65 psi for a typical paint gun. The stepdown assures adequate pressure reserve in the tank. It is also necessary to assure an appropriate pressure recovery rate in the tank. In that regard the ratio of the maximum flow rate into the tank and the maximum flow rate in cubic fee per minute (cfm) should be 1.5 to 1 or greater.

I claim:

1. A compressed air delivery system for delivering clean, dry compressed air from a source of compressed air to a compressed air appliance at a constant pressure, comprising:

- a. a tank essentially cylindrical in cross-section having a side wall, a top end cap, and a bottom end cap defining an internal chamber, wherein the tank is mounted with its axis oriented vertically;
- b. inlet means for the tank comprising:
  - i. an inlet port in communication with the internal chamber;
  - ii. a step down regulator; and
  - iii. a check valve wherein the check valve and step down regulator are connected in series with each other and connected to the source of compressed air to the inlet port;
- c. a pressure relief valve;
- d. a drain valve;
- e. outlet means for the tank comprising:
  - i. an outlet port located in the top end cap of the tank in communication with the internal chamber;
  - ii. coalescing filter means external the tank; and
  - iii. particulate filter means external the tank, wherein the coalescing filter and particulate filter are connected in series with each other and connect the outlet port to the compressed air appliance.

2. The compressed air delivery system of claim 1, wherein the outlet means further includes a drop tube extending downward inside the tank from the outlet port and having a number of restricted openings along its length.

3. The compressed air delivery system of claim 2, wherein the drop tube also has an internal core with a surface on which moisture can condense and a drain opening for escape of such condensed moisture.

4. The compressed air delivery system of claim 1 or 2, wherein the particulate filter means comprises a filter medium with a maximum solid particle passed of about 40 microns.

5. The compressed air delivery system of claim 1 or 2, wherein the coalescing filter means comprises a filter medium having a D.O.P. efficiency of at least 99.97% with a maximum aerosol particle size passed of 0.75 microns.

6. The compressed air delivery system of claim 1, wherein the inlet means further includes an inlet tube extending into the tank and having a number of openings along its length and having an oil inert packing inside which packing provides a tortuous path with large surface area while minimizing air pressure drop through the packing and tube.

7. The compressed air delivery system of claim 6, wherein the packing is selected from the group consisting of foam rubber, fiber glass, stranded aluminum, and stranded stainless steel.

8. The compressed air delivery system of claim 6, wherein the outlet means further includes a drop tube extending downward inside the tank from the outlet port and having a number of restricted openings along its length.

9. The compressed air delivery system of claim 8, wherein the drop tube also has an internal core with a surface on which moisture can condense and a drain opening for escape of such condensed moisture.

10. The compressed air delivery system of claim 6 or 8, wherein the particulate filter means comprises a filter medium with a maximum solid particle passed of about 40 microns.

11. The compressed air delivery system of claim 6 or 8, wherein the coalescing filter means comprises a filter medium having a D.O.P. efficiency of at least 99.97% with a maximum aerosol particle size passed of 0.75 microns.

12. The compressed air delivery system of claim 1, wherein the tank has a set of wheels mounted on the bottom end cap.

13. The compressed air delivery system of claim 1, wherein a hose connects the outlet means to the compressed air appliance which hose is anchored to the tank adjacent the bottom end cap.

14. The compressed air delivery system of claim 1, wherein the inlet port, the step down regulator, and the check valve are interconnected by brass fittings and the outlet port, the coalescing filter means, and the particulate filter are interconnected by brass fittings.

* * * * *